United States Patent [19]
Lutz

[11] Patent Number: 5,987,864
[45] Date of Patent: Nov. 23, 1999

[54] FRONT MOUNTED RAKE

[76] Inventor: Henry Lutz, Site 25, Box 4, R.R. #2, Carvel, Alberta T0E 0H0, Canada

[21] Appl. No.: 09/179,346

[22] Filed: Oct. 21, 1998

[51] Int. Cl.$^6$ .................................................. A01D 77/00
[52] U.S. Cl. .............................................................. 56/377
[58] Field of Search ............................. 56/341, 344, 370, 56/377, 375, 380, 384, 397, 228, 350; 172/311, 456, 459

[56] References Cited

U.S. PATENT DOCUMENTS

| | | | |
|---|---|---|---|
| 2,635,411 | 4/1953 | Hicks | 56/377 |
| 2,893,192 | 7/1959 | Tallman | 56/377 X |
| 2,975,582 | 3/1961 | Pollard | 56/377 |
| 3,706,191 | 12/1972 | Barbot | 56/377 |
| 4,183,198 | 1/1980 | Sligter | 56/377 |
| 4,214,428 | 7/1980 | Caraway | 56/341 |
| 4,753,063 | 6/1988 | Buck | 56/377 |

FOREIGN PATENT DOCUMENTS

| | | |
|---|---|---|
| 1066068 | 11/1979 | Canada . |
| 1139571 | 1/1983 | Canada . |
| 4142496A1 | 5/1993 | Germany . |

OTHER PUBLICATIONS

Tram Sales Ltd. product brochure, 1 page, undated.

*Primary Examiner*—Robert E. Pezzuto
*Attorney, Agent, or Firm*—Davis and Bujold

[57] ABSTRACT

A front mounted rake includes a primary support, a first arm and a second arm. Tine wheels are mounted each of the arms. The first end of each arm is secured for pivotal movement about both a substantially vertical axis and about a substantially horizontal axis to the primary support. The second end of each arm is supported by ground engaging wheels. A brace maintains the relative lateral spacing of the arms. The pivotal movement of the second arm about the substantially horizontal axis is independent of the pivotal movement of the first arm about the substantially horizontal axis thereby permitting the first arm and the second arm to independently raise and lower as the ground engaging wheels travel over ground contours.

8 Claims, 5 Drawing Sheets

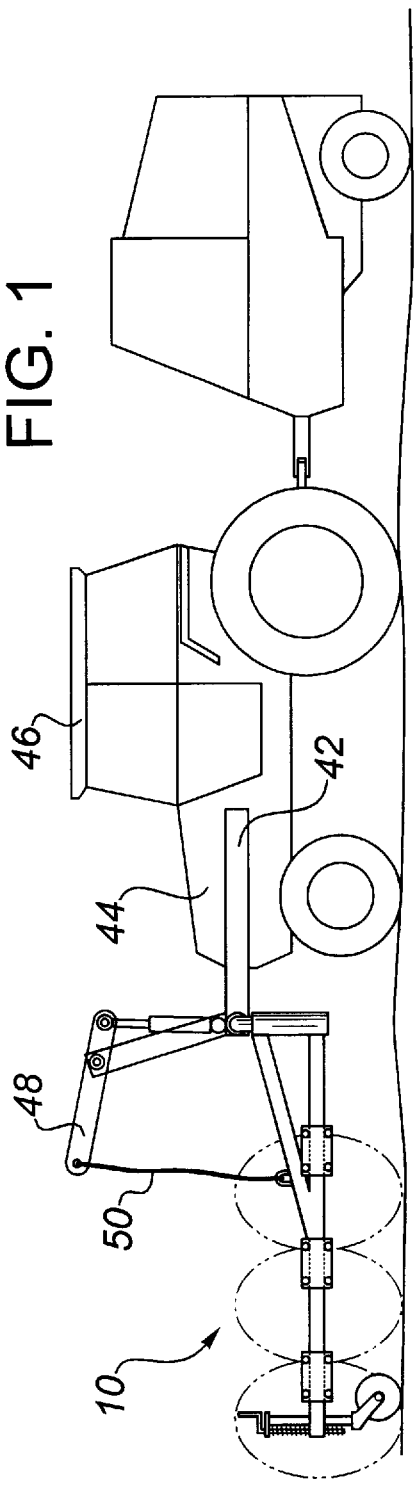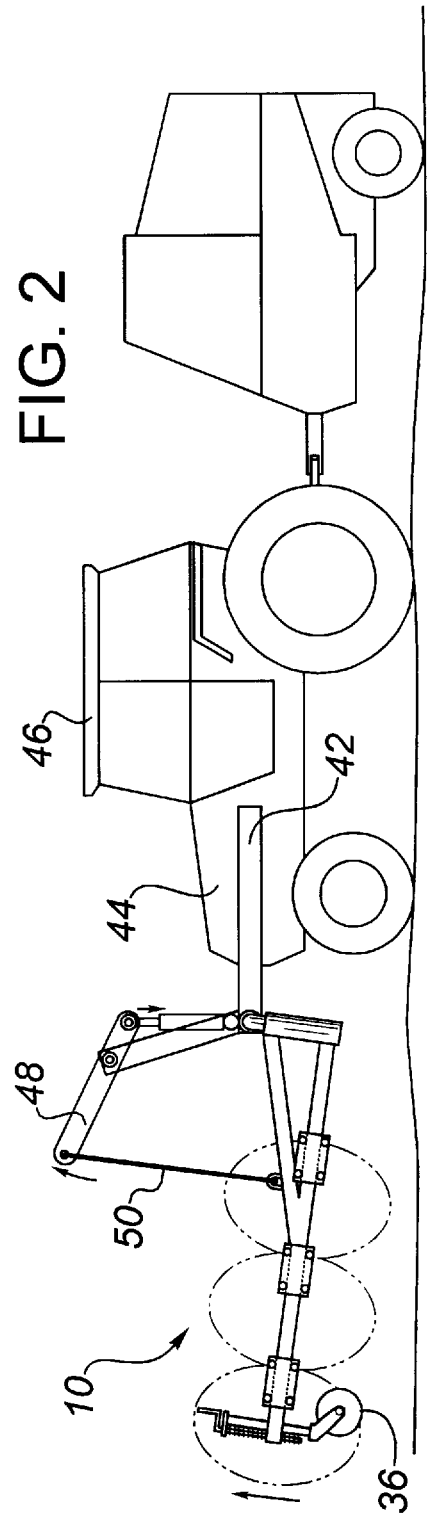

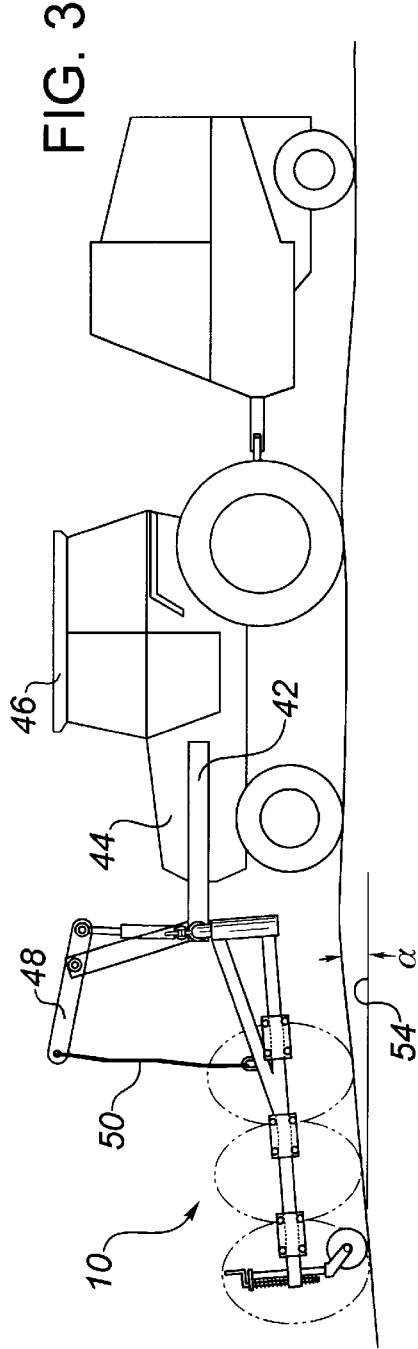
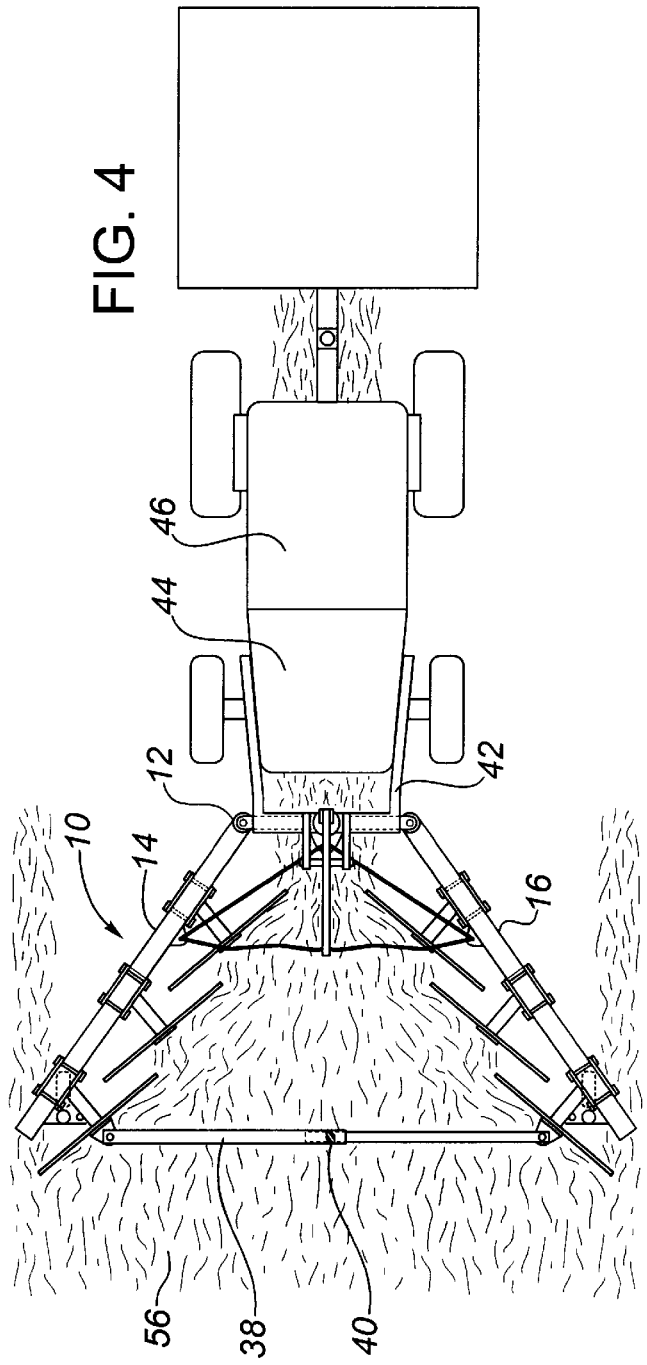

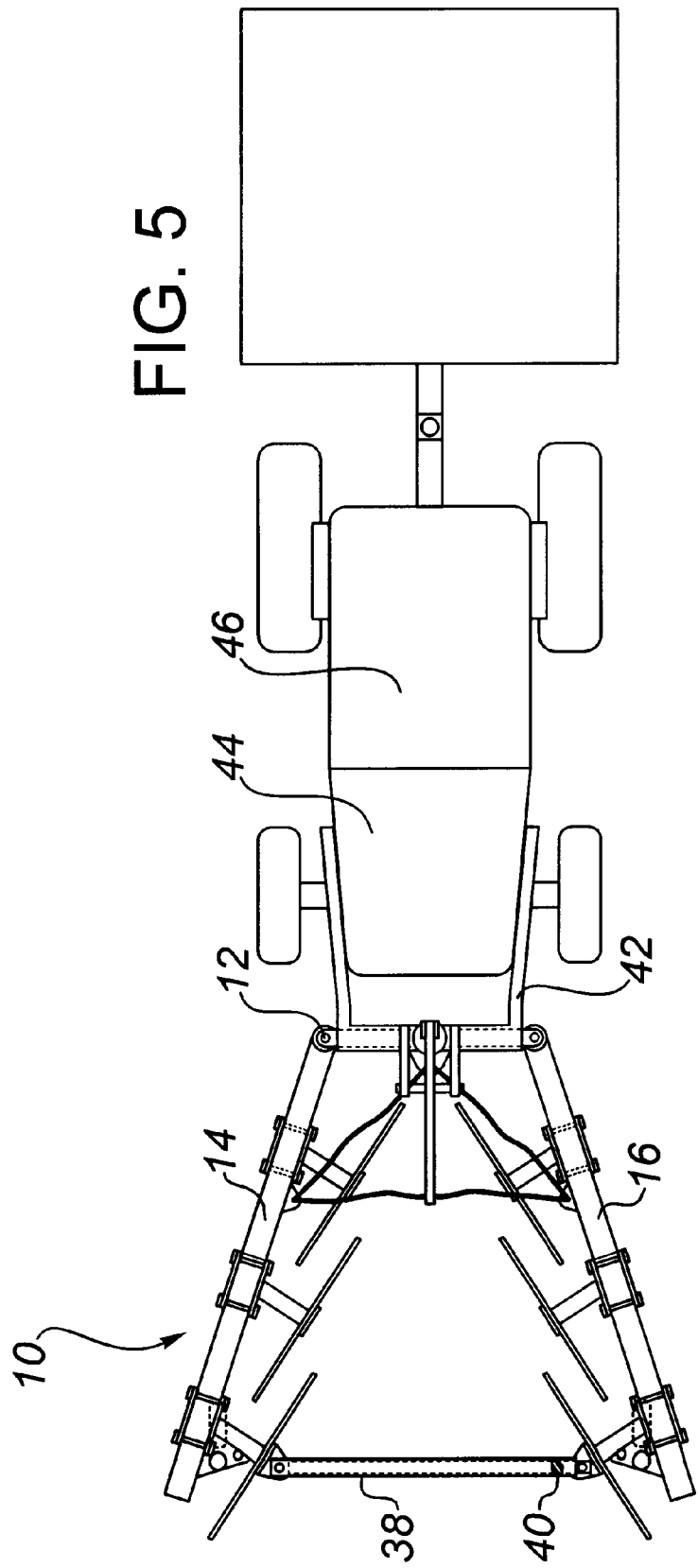

FRONT MOUNTED RAKE

FIELD OF THE INVENTION

The present invention relates to a rake that mounts on the front of a tractor and, in particular, one that can be used with a baler pulled behind the tractor to rake and bale hay.

BACKGROUND OF THE INVENTION

German Patent 4,142,496 which was published in 1993 discloses a rake that mounts on the front of a tractor. The rake consists of a frame that supports two raking assemblies which rotate about a substantially vertical axis. Each raking assembly has a plurality of radially extending arms that have depending tines.

Canadian Patent 1,066,068 which issued to Hering in 1979 discloses a rake that mounts toward the front of a tractor. The Hering rake consists of a frame that supports two raking assemblies in a "V" shaped configuration with the front of the tractor positioned in the middle of the "V". The raking assemblies rotate about a substantially horizontal axis. Each raking assembly has a plurality of parallel extending arms that have depending tines.

U.S. Pat. No. 4,214,428 which issued to Caraway in 1980 discloses a rake that mounts to the front of a tractor. The frame supports six tine wheels facing outwardly for rotation about a substantially horizontal axis. The tine wheels form a generally "V" shaped configuration in front of the tractor.

SUMMARY OF THE INVENTION

What is required is an alternative configuration of front mounted rake.

According to the present invention there is provided a front mounted rake which includes a primary support, a first arm, and a second arm. The first arm has a first end, a second end, and an interior face. Several tine wheels are mounted on the interior face for rotation about a substantially horizontal axis at spaced interval between the first end and the second end. The first end of the first arm is secured for pivotal movement about both a substantially vertical axis and about a substantially horizontal axis to the primary support. The second end of the first arm is supported by ground engaging wheels. The second arm has a first end, a second end, and an interior face. Several tine wheels are mounted on the interior face for rotation about a substantially horizontal axis at spaced interval between the first end and the second end. The first end of the second arm is secured for pivotal movement about a substantially vertical axis and a substantially horizontal axis to the primary support. The second end of the second arm is supported by ground engaging wheels. Means is provided for maintaining relative lateral spacing of the first arm and the second arm. Means is provided to attach the primary support to a front of tractor. The pivotal movement of the second arm about the substantially horizontal axis is independent of the pivotal movement of the first arm about the substantially horizontal axis thereby permitting the first arm and the second arm to independently raise and lower as the ground engaging wheels travel over ground contours.

The front mounted rake, as described above, is considered to be superior to any front mounted rake disclosed in the prior art. The first arm and the second arm adjust their horizontal positioning to independently follow ground contours. The adjustment of relative lateral spacing of the first arm and the second arm enables the arms to assume a variety of positions. The arms can be folded together to fit through gates or travel down highways. The arms can be spread any desired distance apart to assume a desired working position. The tine wheels are on the interior surface of the arms. There is, therefore, no internal structure against which hay can bunch.

Although there are various means that could be employed for maintaining the relative lateral positioning of the first arm and the second arm, the preferred means is an extendible brace. The extendible brace extends between the second end of the first arm and the second end of the second arm. It is preferred as it is more cost effective than alternatives, such as the use of hydraulics.

Although beneficial results may be obtained through the use of the front mounted rake, as described above, in the form described it is cumbersome to move down a highway when changing fields. Even more beneficial results may, therefore, be obtained when a lifting arm is provided whereby the first arm and the second arm are lifted to assume a raised travel position. This also allows the rake to be raised rapidly when coming to the end of a swath at the edge of a field.

Although beneficial results may be obtained through the use of the front mounted rake, as described above, there are times when it is desirable to change the configuration of the tine wheels to alter the flow of hay. Even more beneficial results may, therefore, be obtained when the tine wheels are detachably soured to the first arm and the second arm by means of clamps. This permits the tine wheels to be moved axially along the first arm and the second arm. This enables adjustments to be made to accommodate the intake capacity of a baler.

BRIEF DESCRIPTION OF THE DRAWINGS

These and other features of the invention will become more apparent from the following description in which reference is made to the appended drawings, wherein:

FIG. 1 is a side elevation view of a front mounted rake constructed in accordance with the teachings of the present invention in a working position.

FIG. 2 is a side elevation view of the front mounted rake illustrated in FIG. 1, in a travel position.

FIG. 3 is a side elevation view of the front mounted rake illustrated in FIG. 1, in a working position on an incline.

FIG. 4 is a top plan view of the front mounted rake illustrated in FIG. 1, in a working position.

FIG. 5 is a top plan view of the front mounted rake illustrated in FIG. 1, in a travel position.

DETAILED DESCRIPTION OF THE PREFERRED EMBODIMENT

Figure 6:
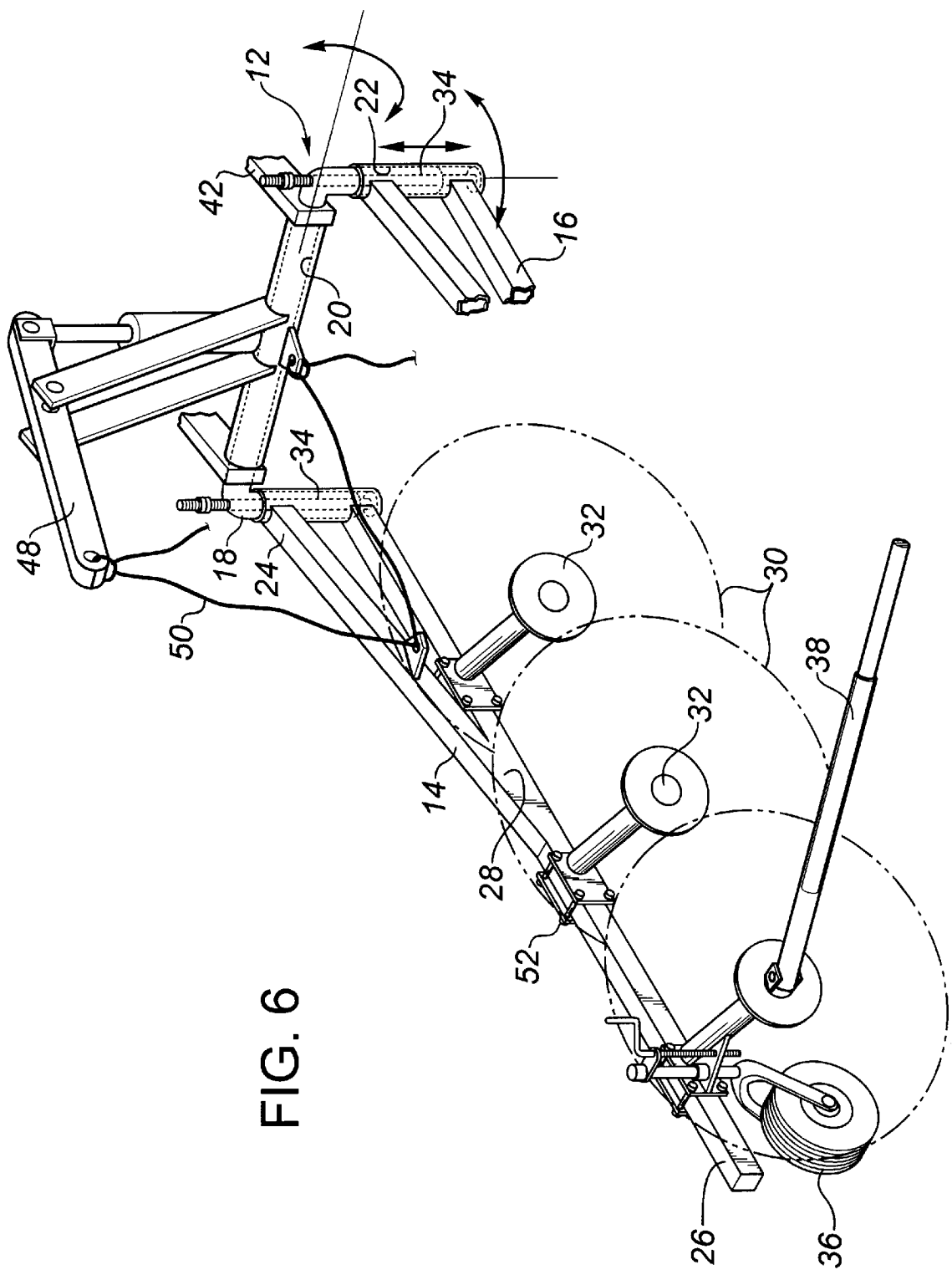
FIG. 6 is a detailed perspective view of a portion of the front mounted rake illustrated in FIG. 1.

The preferred embodiment, a front mounted rake generally identified by reference numeral 10, will now be described with reference to FIGS. 1 through 7.

Figure 7:
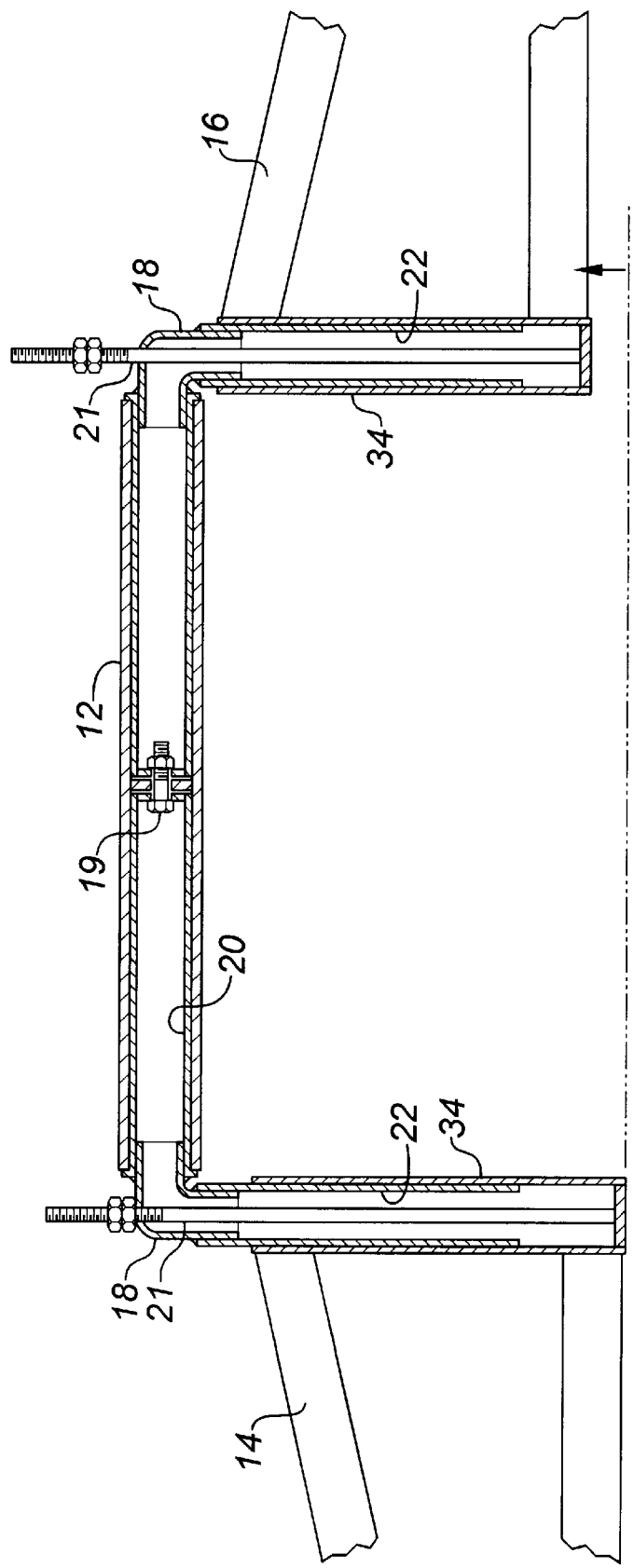
FIG. 7 is a detailed section view of a portion of the front mounted rake illustrated in FIG. 6.

Referring to FIGS. 4 and 5, front mounted rake 10 includes a primary support 12, a first arm 14 and a second arm 16. Referring to FIG. 7, the means for mounting first arm 14 and second arm 16 to primary support 12 includes a connecting member 18 having a first portion 20 and a second portion 22. First portion 20 is telescopically mated for relative rotation in a substantially horizontal orientation with primary support 12. Second portion 22 is telescopically mated for relative rotation in a substantially vertical orientation with one of first arm 14 and second arm 16. First portions 20 of connecting members 18 are prevented from separating from primary support 12 by fastener 19. Second portions 22 of connecting members 18 are prevented from separating from first arm 14 or second arm 16 by fastener 21. Referring to FIG. 6, each of first arm 14 and second arm 16 have a first end 24, a second end 26, and an interior face 28. Several tine wheels 30 are mounted on interior face 28 for rotation about a substantially horizontal axis represented by mounting fixtures 32 at spaced intervals between first end 24 and second end 26. First end 24 of first arm 14 is secured for pivotal movement about a substantially vertical axis, represented by a sleeve 34, to second portion 22 of primary support 12. Second end 26 of first arm 14 is supported by ground engaging wheels 36. Second arm 16 is identical to first arm 14, and is similarly mounted by a sleeve 34 to second portion 22 of primary support 12. Those identical features of first arm 14 and second arm 16 will be identified with the same reference numerals. Referring to FIGS. 4, 5 and 6, a telescopically extendible brace 38 extends between second end 26 of first arm 14 and second end 26 of second arm 16. This maintains the relative lateral spacing of first arm 14 and second arm 16. Referring to FIGS. 4 and 5, brace 38 is maintained in a selected telescopic position by means of locking pins 40. A support bracket 42 is used to attach primary support 12 to a front 44 of a tractor 46. Referring to FIGS. 1 through 3 and 6, a lifting arm 48 is mounted on support bracket 42. Lifting arm 48 is attached by lines 50 to first arm 14 and second arm 16. Referring to FIG. 6, mounting fixtures 32 for tine wheels 30 are detachably secured to first arm 14 and second arm 16 by means of clamps 52.

The use and operation of front mounted rake 10 will now be described with reference to FIGS. 1 through 7. Referring to FIGS. 2 and 5, front mounted rake 10 is moved along a highway to a field in a travel position. Referring to FIG. 2, in the travel position first arm 14 and second arm 16 are raised by means of lifting arm 48 so that ground engaging wheels 36 do not touch the ground. Referring to FIG. 5, in the travel position brace 38 is placed at its shortest setting to reduce the width of the unit. Referring to FIGS. 1 and 4, when front mounted rake 10 arrives at the field where it is to work, it is changed to a working position. Referring to FIG. 1, lifting arm 48 lowers first arm 14 and second arm 16 until ground engaging wheels engage the ground. Referring to FIG. 4, brace 38 is extended to place first arm 14 and second arm 16 in a wide generally "V" shaped stance and then locked in position by means of locking pins 40. Referring to FIG. 3, as tractor 46 moves forward, ground engaging wheels 36 follow the contour of the groundsurface, generally identified by reference numeral 54. In the illustration groundsurface 54 has a slope represented by angle "a". Referring to FIG. 7, the pivotal movement of second arm 16 about the substantially horizontal axis is independent of the pivotal movement of first arm 14 about the substantially horizontal axis. This permits first arm 14 and second arm 16 to independently raise and lower as ground engaging wheels 36 travel over ground contours. This is made possible as first portion 20 of connecting member 18 is telescopically mated for relative rotation in a substantially horizontal orientation with primary support 12. Referring to FIG. 4, the flow of hay is shown. Hay is generally identified by reference numeral 56. Tine wheels 30 are in a staggered or overlapping configuration. Hay 56 is passed from tine wheel to tine wheel as it moves from second end 26 of each of the arms 14 and 16 toward first end 24. Hay 56 does not bunch up under either of arms 14 or 16, nor does it bunch up against mounting fixtures 32, tine wheels 30 direct hay 56 away from the support structure of arms 14 and 16 and mounting fixtures 32. If a change in the flow of hay 56 is desired, the relative positioning of tine wheels 30 can be altered. Referring to FIG. 6, mounting fixtures 32 for tine wheels 30 are detachably secured to first arm 14 and second arm 16 by means of clamps 52. Clamps 52 can be loosened to enable tine wheels 30 to be slid axially in any desired direction.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A front mounted rake, comprising:

a primary support;

a first arm having a first end, a second end, an interior face and several tine wheels mounted on the interior face for rotation about substantially horizontal rotational axes at spaced interval between the first end and the second end, the first end of the first arm being secured for pivotal movement about both a first substantially vertical axis and about a first substantially horizontal axis to the primary support, the second end of the first arm being supported by ground engaging wheels;

a second arm having a first end, a second end, an interior face and several tine wheels mounted on the interior face for rotation about substantially horizontal rotational axes at spaced interval between the first end and the second end, the first end of the second arm being secured for pivotal movement about a second substantially vertical axis and a second substantially horizontal axis to the primary support, the second end of the second arm being supported by ground engaging wheels;

a brace extending between the first arm and the second arm, thereby maintaining relative lateral spacing of the first arm and the second arm;

a mounting bracket secured to the primary support whereby the primary support is attached to a front of a tractor;

the pivotal movement of the second arm about the second substantially horizontal axis being independent of the pivotal movement of the first arm about the first substantially horizontal axis thereby permitting the first arm and the second arm to independently raise and lower as the ground engaging wheels travel over ground contours; and a lifting arm attached by at least one lift line to the first arm and the second arm, the first arm and the second arm being supported solely by the ground engaging wheels in an operative position ground working position, the first arm and the second arm being suspended from the lifting arm by the at least one lifting line to assume a raised travel position.

2. The front mounted rake as defined in claim 1, wherein means is provided for mounting each of the first arm and the second arm to the primary support including:

a connecting member having a first portion and a second portion;

the first portion being telescopically mated for relative rotation in a substantially horizontal orientation with one of the first arm and the second arm.

3. The front mounted rake as defined in claim 1, wherein the tine wheels are detachably secured to the first arm and the second arm by means of clamps, thereby permitting the tine wheels to be moved axially along the first arm and the second arm.

4. A front mounted rake, comprising:

a primary support having attachment brackets, whereby the primary support is mounted to a front of tractor;

a first arm having a first end, a second end, an interior face and several tine wheels mounted on the interior face for rotation about a substantially horizontal rotational axes at spaced interval between the first end and the second end, the first end of the first arm being secured for pivotal movement about both a first substantially vertical axis and about a first substantially horizontal axis to the primary support by a connecting member having a first portion and a second portion, the first portion being telescopically mated for relative rotation in a substantially horizontal orientation with the primary support, the second portion being telescopically mated for relative rotation in a substantially vertical orientation with the first end of the first arm, the second end of the first arm being supported by ground engaging wheels;

a second arm having a first end, a second end, an interior face and several tine wheels mounted on the interior face for rotation about a substantially horizontal rotational axes at spaced interval between the first end and the second end, the first end of the second arm being secured for pivotal movement about a second substantially vertical axis and a second substantially horizontal axis to the primary support by a connecting member having a first portion and a second portion, the first portion being telescopically mated for relative rotation in a substantially horizontal orientation with the primary support, the second portion being telescopically mated for relative rotation in a substantially vertical orientation with the first end of the second arm, the second end of the second arm being supported by ground engaging wheels, the pivotal movement of the second arm about the second substantially horizontal axis being independent of the pivotal movement of the first arm about the first substantially horizontal axis thereby permitting the first arm and the second arm to independently raise and lower as the ground engaging wheels travel over ground contours;

a brace maintaining relative lateral spacing of the first arm and the second arm; and a lifting arm attached by at least one lift line to the first arm and the second arm, the first arm and the second arm being supported solely by the ground engaging wheels in an operative position ground working position, the first arm and the second arm being suspended from the lifting arm by the at least one lifting line assume a raised travel position.

5. The front mounted rake as defined in claim 4, wherein the brace is telescopically extendible.

6. The front mounted rake as defined in claim 4 wherein the tine wheels are detachably secured to the first arm and the second arm by means of clamps, thereby permitting the tine wheels to be moved axially along the first arm and the second arm.

7. A front mounted rake, comprising:

a primary support;

a first arm having a first end, a second end, an interior face and a plurality of tine wheels mounted on the interior face for rotation about substantially horizontal rotational axes at spaced interval between the first end and the second end, the first end of the first arm being secured for pivotal movement about both a first substantially vertical axis and about a first substantially horizontal axis to the primary support, the second end of the first arm being supported by ground engaging wheels;

a second arm having a first end, a second end, an interior face and a plurality of tine wheels mounted on the interior face for rotation about substantially horizontal rotational axes at spaced intervals between the first end and the second end, the first end of the second arm being secured for pivotal movement about a second substantially vertical axis and a second substantially horizontal axis to the primary support, the second end of the second arm being supported by ground engaging wheels;

a brace extending between the first arm and the second arm, thereby maintaining relative lateral spacing of the first arm and the second arm;

a mounting bracket secured to the primary support whereby the primary support is attached to a front of a tractor;

the pivotal movement of the second arm about the second substantially horizontal axis being independent of the pivotal movement of the first arm about the first substantially horizontal axis thereby permitting the first arm and the second arm to independently raise and lower as the ground engaging wheels travel over ground contours; and a lifting arm attached to the first arm and the second arm via at least one lift line, the first arm and the second arm being supported solely by the ground engaging wheels in an operative working position, the first arm and the second arm being raised and suspended by the lifting arm via the at least one lifting line to assume a raised travel position.

8. The front mounted rake as set forth in claim 7 wherein the tine wheels are individually detachably secured to the first arm and second arm by means of clamps, thereby permitting the tine wheels to be individually axially adjusted with respect to one another along the first arm and the second arm.

* * * * *